G. S. Reynolds.
Harvester Cutter.
No. 1911
32915
Patented July 23. 1861.
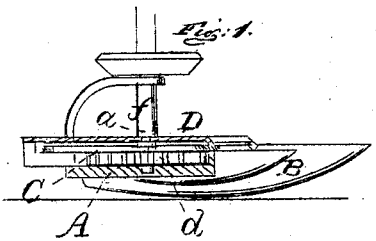
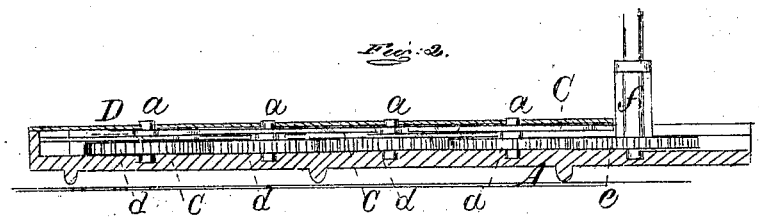
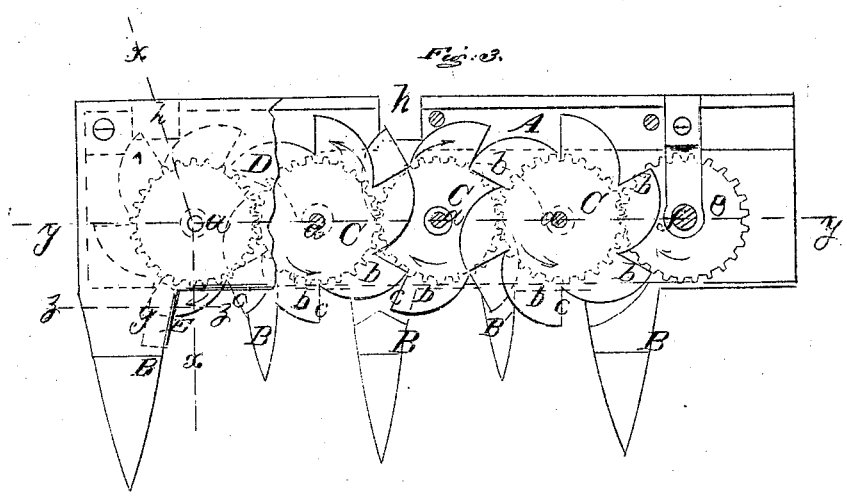
Witnesses.
Inventor.
George S. Reynolds

UNITED STATES PATENT OFFICE.

GEO. S. REYNOLDS, OF TUNBRIDGE, VERMONT, ASSIGNOR TO HIMSELF, JAS. BROWN, AND J. W. WHITNEY, OF SAME PLACE.

IMPROVEMENT IN HARVESTERS.

Specification forming part of Letters Patent No. 32,915, dated July 23, 1861.

*To all whom it may concern:*

Be it known that I, GEORGE S. REYNOLDS, of Tunbridge, in the county of Orange and State of Vermont, have invented a new and Improved Cutting Apparatus or Device for Grain and Grass Harvesters; and I do hereby declare that the following is a full, clear, and exact description of the same, reference being had to the annexed drawings, making a part of this specification, in which—

Figure 1 is a transverse section of my invention, taken in the line $x\ x$, Fig. 3; Fig. 2, a longitudinal vertical section of the same, taken in the line $y\ y$, Fig. 3; Fig. 3, a plan or top view of the same; Fig. 4, a transverse section of one of the fingers, taken in the line $z\ z$, Fig. 3.

Similar letters of reference indicate corresponding parts in the several figures.

This invention relates to an improved cutting-device for harvesters of that class in which rotary cutters are used.

The invention consists in combining a series of rotating cutters with stationary fingers, and guards of unequal size, and stationary cutters, the parts being arranged as hereinafter fully shown and described, so as to insure an easy cutting operation without the liability of choking and clogging.

To enable those skilled in the art to fully understand and construct my invention, I will proceed to describe it.

A represents a finger-bar having fingers B of large size and small intermediate guards, B'.

C represents rotary cutters, the axes $a$ of which are fitted vertically in the finger-bar midway between the axes of the fingers B and guards B'. These cutters C overlap each other and are toothed, as shown at $b$ in Fig. 3. These teeth may be of any suitable form, their cutting-edges $c$ working over the fingers B in the direction indicated by the arrows.

On the axes $a$ of the rotary cutters C below the cutters there are placed toothed wheels $d$, which gear into each other and insure a rotary movement of all the cutters by operating one of the wheels $d$, which may be done by means of a wheel, $e$, on a shaft, $f$, the latter being rotated by bevel-gears or by a crank. The finger-bar A is covered by a plate or cap, D, the larger portion of which is broken away in Fig. 3. This plate or cap has projections $g$ at its front end which fit over the fingers B, and have each cutters E permanently attached at the sides and in such a position that the cutting-edges $c$ of the cutters C will work underneath them and operate similar to shears. (See Fig. 3.) The fingers B, at their edges beneath the stationary cutters E, serve as bearings for the grass or grain and greatly facilitate the cutting operation. The finger-bar A has a recess in its upper surface to receive the wheels $d$, and at the back part of the finger-bar A there are openings $h$, an opening being directly back of each pair of cutters where they lap over and move outward or from each other in their rotation. (See Fig. 3.) As the machine is drawn along, the cutters C are rotated from the driving-wheel, and the grass or grain being gathered and deflected between the fingers B and separated sufficiently by the guards B' to admit the teeth $b$, is cut as the edges $c$ of the cutters pass underneath the stationary cutters E; and in case any blades of grass or straw should chance to be drawn into the front part of the finger-bar by the action of the cutters they will, from the same cause, be expelled through the opening $h$ at the back of the finger-bar, and the cutters, therefore, will be prevented from choking or or clogging. The cutters C may be driven quite rapidly with but a light draft, as the cutting operation is performed with less power than by the reciprocating sickle. The machine also is not subjected to the racking and jarring which attends those provided with the reciprocating sickle, and the operating or working parts are not therefore liable to so much wear.

I am aware that harvesting-machines have previously been constructed with series of rotary toothed cutters, and also that such cutters have been made to cut shearwise in connection with the finger.

I do not claim, broadly, the employment or use of rotary cutters; but

I do claim as new and desire to secure by Letters Patent—

The combination of the rotary toothed cutters C, horizontal train of gearing $d$, fingers B, small guards B', and stationary cutters E, with the bar A, all constructed, arranged, and operating substantially in the manner and for the purposes herein shown and explained.

GEO. S. REYNOLDS.

Witnesses:
JAMES M. WHITNEY,
JOHN L. HALL.